United States Patent
Fukushima et al.

(10) Patent No.: US 6,520,880 B1
(45) Date of Patent: Feb. 18, 2003

(54) TRACTION DISTRIBUTING DEVICES FOR MOTOR VEHICLES

(75) Inventors: Naoto Fukushima, Kanagawa (JP); Teruhiko Mochizuki, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/506,368

(22) Filed: Feb. 18, 2000

Related U.S. Application Data (63) Continuation-in-part of application No. 08/916,930, filed on Aug. 22, 1997, now abandoned.

(30) Foreign Application Priority Data

| Aug. 22, 1996 | (JP) | ............................................. 8-221092 |
| Sep. 11, 1996 | (JP) | ............................................. 8-240651 |
| May 13, 1997 | (JP) | ............................................. 9-122047 |
| May 29, 1997 | (JP) | ............................................. 9-139755 |

(51) Int. Cl.[7] ............................................. F16H 48/20
(52) U.S. Cl. ......................................... 475/84; 180/76
(58) Field of Search ...................... 475/2, 6, 18, 22–23, 475/27, 83–91, 231, 249; 180/305, 307, 308, 197, 76

(56) References Cited

U.S. PATENT DOCUMENTS

| 2,994,233 A | | 8/1961 | Gerard ...................... 475/72 X |
| 3,762,161 A | * | 10/1973 | Pennig ......................... 60/325 |
| 3,987,689 A | * | 10/1976 | Engle ........................... 475/88 |
| 4,633,735 A | | 1/1987 | Sakurai et al. ............. 475/84 X |
| 4,667,763 A | | 5/1987 | Nembach ..................... 180/243 |
| 4,785,714 A | * | 11/1988 | Tamada et al. ............... 60/327 |
| 4,867,012 A | | 9/1989 | McGarraugh ................. 475/72 |
| 4,882,947 A | * | 11/1989 | Barnard ....................... 475/23 |
| 4,974,471 A | | 12/1990 | McGarraugh |
| 5,117,956 A | * | 6/1992 | Tsujita ........................ 475/231 |
| 5,127,888 A | | 7/1992 | Esaki |
| 5,302,158 A | * | 4/1994 | Kwasniewski .............. 475/160 |
| 5,310,388 A | * | 5/1994 | Okcuoglu et al. ............ 475/88 |
| 5,415,596 A | | 5/1995 | Zulu ............................ 475/27 |
| 5,518,463 A | * | 5/1996 | Shibahata et al. ........ 475/84 X |

FOREIGN PATENT DOCUMENTS

| DE | 931 633 C | 8/1955 |
| EP | 0 496 469 A1 | 7/1992 |
| JP | 63-57331 | 3/1988 |
| JP | 04078351 | 3/1992 |
| JP | 7-18481 | 3/1995 |
| WO | WO 93/19310 | 9/1993 |

OTHER PUBLICATIONS

Honda Motor, Co., Ltd., "Direct Yaw Control System", May 29, 1996.

* cited by examiner

Primary Examiner—Ankur Parekh
(74) Attorney, Agent, or Firm—Foley & Lardner (57) ABSTRACT

A traction distribution device includes a hydraulic motor arranged in a differential-gear mechanism for providing relative torque between one of the wheel shafts and a differential casing in accordance with the direction of a hydraulic pressure supplied thereto. A pressure regulating valve is arranged to control the hydraulic pressure supplied to the motor, whereas a selector valve is arranged to switch the direction of the hydraulic pressure supplied to the motor.

5 Claims, 13 Drawing Sheets

TRACTION DISTRIBUTING DEVICES FOR MOTOR VEHICLES

CROSS-REFERENCE TO RELATED APPLICATIONS

This application is a continuation-in-part of application Ser. No. 08/916,930, filed Aug. 22, 1997 now abandoned.

BACKGROUND OF THE INVENTION

The present invention relates to traction distributing devices for motor vehicles, which enable active control of the rate of distribution of traction with regard to right- and left-wheel shafts.

One of the known traction distribution devices is shown in the bulletin "Direct Yaw Control System" published by HONDA MOTOR, CO., LTD. on May 29, 1996.

Figure 4:
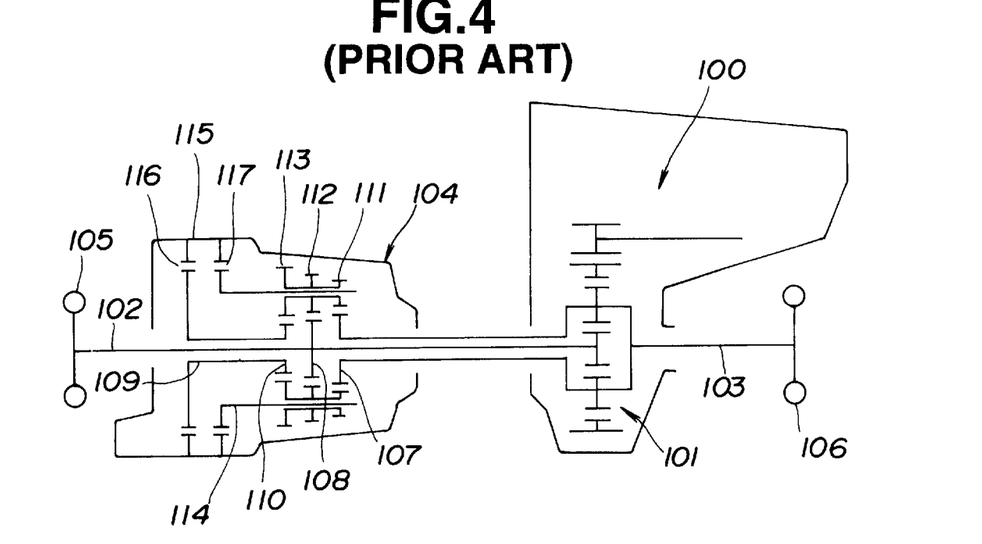
FIG. 4 is a skeleton diagram showing a drive system including a known traction distribution device.

FIG. 4 shows a drive system including such a traction distribution device. A transmission 100 includes a differential-gear mechanism 101 which serves to equally distribute traction to shafts 103, 102 of right and left wheels 106, 105. A unit 104 is mounted to the left-wheel shaft 102 to ensure active control of the rate of distribution of traction with regard to the wheel shafts 103, 102. Disposed coaxially in the unit 104 are a right sun gear 107 mounted to the right-wheel shaft 103, a central sun gear 108 mounted to the left-wheel shaft 102, a left sun gear 110 mounted to a sun-gear shaft 109, and a carrier 114 for rotatably supporting pinions 111, 112, 113 integrated therewith. The pinions 111, 112, 113 are engaged with the sun gears 107, 108, 110, respectively, to be capable of revolving on their axis and therearound. A right-cornering clutch 117 is interposed between the carrier 114 and a casing 115 of the unit 104, whereas a left-cornering clutch 116 is interposed between the sun-gear shaft 109 and the casing 115.

When the vehicle comers right, the right-cornering clutch 117 fixes the carrier 114 so that a transmission system including the sun gear 107, the pinions 111, 112, and the sun gear 108 increases the rotating speed of the left-wheel shaft 102 with respect to that of the right-wheel shaft 103. It is understood that active control of the rate of distribution of traction with regard to the right- and left-wheel shafts 103, 102 contributes to an improvement in the cornering performance, etc. of the vehicle.

With the known traction distribution device, however, active control of the rate of distribution of traction with regard to the right- and left-wheel shafts 103, 102 is ensured by switching of complicated gear trains, resulting in inevitable increase in size, weight, and manufacturing cost of the device.

It is, therefore, an object of the present invention to provide traction distribution devices for motor vehicles which contribute to a reduction in size, weight, and manufacturing cost.

SUMMARY OF THE INVENTION

One aspect of the present invention lies in providing a traction distribution device for a motor vehicle with a differential-gear mechanism for transmitting torque of a differential casing to wheel shafts, the device comprising:

a source of a hydraulic pressure, the source including a hydraulic pump which produces the hydraulic pressure by torque of the differential casing;

a hydraulic motor arranged in the differential-gear mechanism, the motor providing relative torque between one of the wheel shafts and the differential casing in accordance with a direction of the hydraulic pressure supplied thereto;

means for controlling the hydraulic pressure supplied to the motor; and means for switching the direction of the hydraulic pressure supplied to the motor.

Another aspect of the present invention lies in providing a traction distribution device for a motor vehicle with a differential-gear mechanism for transmitting torque of a differential casing to wheel shafts, the device comprising:

a hydraulic pump arranged to produce a hydraulic pressure by torque of the differential casing;

a hydraulic motor arranged in the differential-gear mechanism, the motor providing relative torque between one of the wheel shafts and the differential casing in accordance with a direction of the hydraulic pressure supplied thereto;

a first valve interposed between the source and the motor, the first valve controlling the hydraulic pressure supplied to the motor; and a second valve interposed between the source and the motor, the second valve switching the direction of the hydraulic pressure supplied to the motor.

DETAILED DESCRIPTION OF THE INVENTION

Referring to the drawings wherein like reference numerals designate like parts throughout the views, a traction distribution device embodying the present invention will be described.

Figure 1:
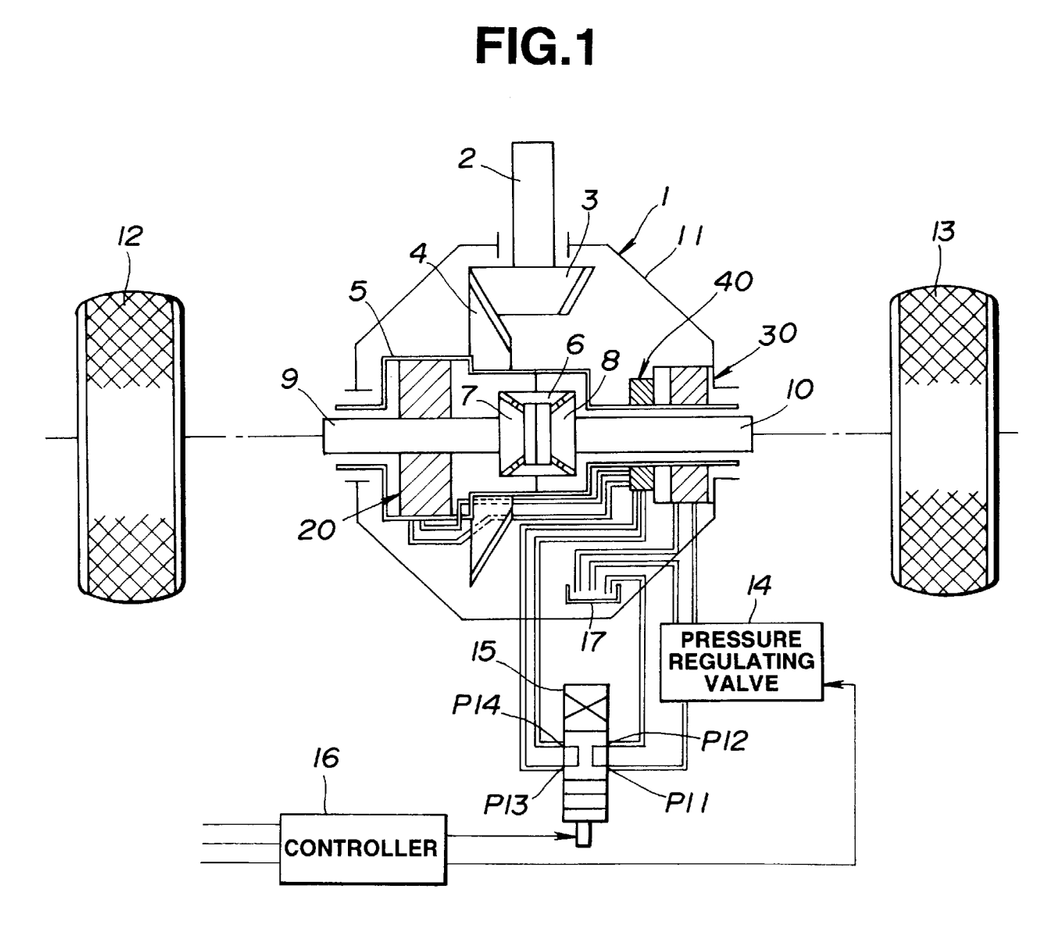
FIG. 1 is a schematic view, partly in section, showing a first embodiment of a traction distribution device according to the present invention.

FIGS. 1–3 and 5 show a first embodiment of the present invention. Referring to FIG. 1, a motor vehicle includes a differential-gear mechanism 1 which has a similar fundamental structure to that of the conventional one such that torque of a propeller shaft 2 is transmitted to a differential casing 5 through a small reduction gear 3 and a large reduction gear 4, which is then equally distributed to shafts 10, 9 of right and left wheels 13, 12 through a small differential gear 6 and large differential gears 8, 7. Rotation of the small differential gear 6 serves to absorb the difference in the number of revolutions of the right- and left-wheel shafts 10, 9. 11 designates a differential housing as a main body of the differential-gear mechanism 1.

A traction distribution device comprises a trochoid motor 20 as a hydraulic motor which can provide relative torque between the left-wheel shaft 9 and the differential casing 5, a trochoid pump 30 as a hydraulic pump which produces a hydraulic pressure by rotation of the differential casing 5.

Figure 2:
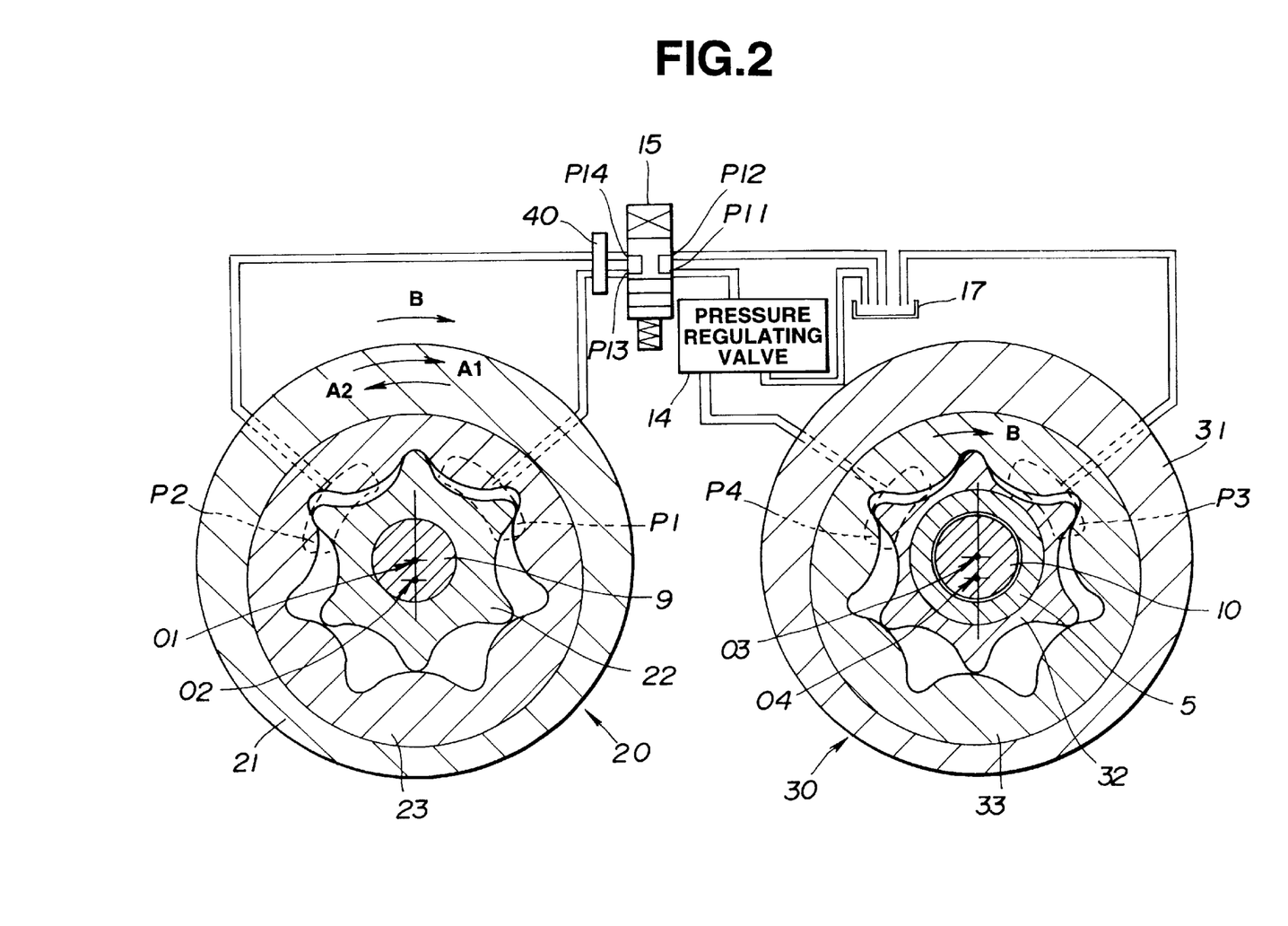
FIG. 2 is a view similar to FIG. 1, showing a trochoid motor and a trochoid pump.

Referring to FIG. 2, the motor 20 comprises in a body 21 an inner trochoid rotor 22 and an outer trochoid rotor 23 rotatably engaged therewith. The body 21 is engaged with the inner side of the differential casing 5, and the inner trochoid rotor 22 is engaged with the left-wheel shaft 9. O1 designates a center of rotation of the left-wheel shaft 9 and the inner trochoid rotor 22, and O2 designates a center of rotation of the outer trochoid rotor 23. Thus, when inhaling (or receiving) hydraulic fluid through a port P1, the rotors 22, 23 are rotated in the direction of arrow A1 whereas when inhaling hydraulic fluid through a port P2, the rotors 22, 23 are rotated in the direction of arrow A2. Moreover, hydraulic fluid is discharged from the port P2 during rotation of the rotors 22, 23 in the direction of arrow A1, whereas it is discharged from the port P1 during rotation thereof in the direction of arrow A2.

In the similar way to the motor 20, the pump 30 comprises in a body 31 an inner trochoid rotor 32 and an outer trochoid rotor 33 rotatably engaged therewith. The body 31 is engaged with the inner side of the differential housing 11, and the inner trochoid rotor 32 is engaged with the differential casing 5. O3 designates a center of rotation of the differential casing 5 and the right-wheel shaft 10 and the inner trochoid rotor 22, and O4 designates a center of rotation of the outer trochoid rotor 33. Thus, when the differential casing 5 is rotated with the inner trochoid rotor 32 in the direction of arrow B, hydraulic fluid is inhaled in the pump 30 through an inlet port P3, which is discharged therefrom through an outlet port P4.

Hydraulic fluid discharged from the outlet port P4 is adjusted in pressure by a pressure regulating valve 14 as hydraulic-pressure controlling means, which is then supplied to a selector valve 15 as switching means. The pressure regulating valve 14 serves to adjust a pressure of hydraulic fluid in accordance with a control signal derived from a controller 16 to discharge relieved hydraulic fluid to a reservoir 17. The reservoir 17 may be in the form of a receiver arranged to the bottom of the differential-gear mechanism 1 to receive hydraulic fluid as lubricating oil. The reservoir 17 communicates with the inlet port P3 of the pump 30.

The selector valve 15 includes a 4-port 3-position selector valve which is controlled by the controller 16 to give a first, second, or third state in accordance with a switched position. Referring to FIGS. 1–2, the first state is such that inlet ports P11, P12 communicate with each other, and outlet ports P13, P14 communicate with each other. The second state is such that the inlet ports P11 communicates with the outlet port P13, and the inlet port P12 communicates with the outlet port P14. The third state is such that the inlet port P11 communicates with the outlet port P14, and the inlet port P12 communicates with the outlet port P13. The inlet port P11 communicates with the pressure regulating valve 14, and the inlet port P12 communicates with the reservoir 17. The outlet ports P13, P14 communicate with the ports P1, P2 of the motor 20, respectively.

Figure 3:
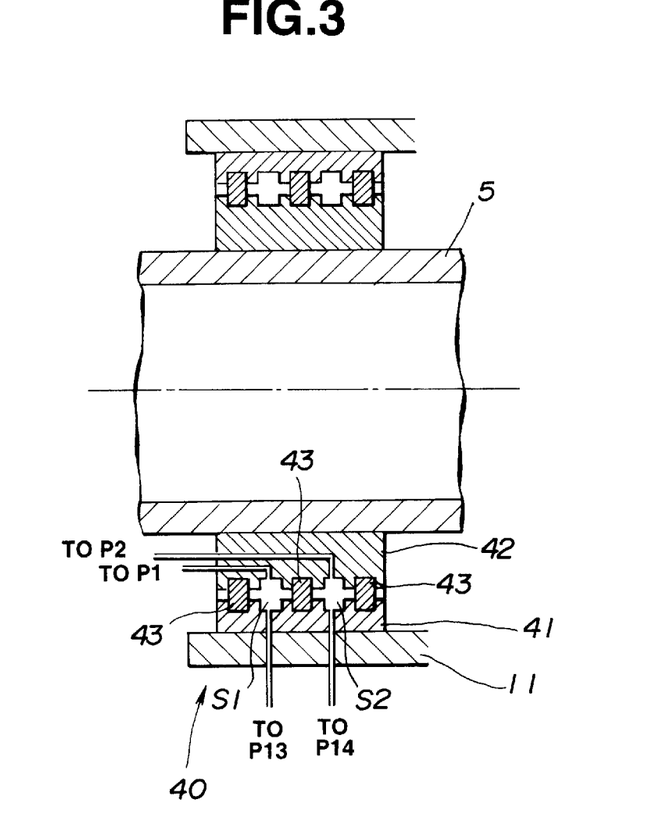
FIG. 3 is a longitudinal section showing a rotary joint.

A rotary joint 40 is arranged in a hydraulic passage between the motor 20 on the side of the differential casing 5 or the rotative side and the selector valve 15 on the differential housing 11 or the stationary side. Referring to FIG. 3, the rotary joint 40 has annular spaces S1, S2 formed, by seals 43, between a body 41 on the side of the differential housing 11 and a rotary member 42 on the side of the differential casing 5. Regardless of relative rotation of the differential casing 5 and the differential housing 11, the spaces S1, S2 serve as a communication passage between the ports P1, P2 of the motor 20 and the outlet ports P13, P14 of the selector valve 15. In view of rotation balance, it is advantageous that hydraulic passages between the rotary joint 40 and the motor 20 are arranged symmetrically with respect to the rotation axis of the differential casing 5. Rotation balance may be ensured by using a balance weight. When, as described above, the reservoir 17 is in the form of a receiver arranged at the bottom of the differential-gear mechanism 1 to receive a predetermined amount of hydraulic fluid as lubricating oil, the receiver allows leaked hydraulic fluid from the seals 43 of the rotary joint 40, resulting in not only simplified structure of the rotary joint 40, but improved durability thereof and heat radiation of hydraulic fluid.

Next, the operation of the first embodiment will be described.

Since the pump 30 is driven by rotation of the differential casing 5, the discharge of hydraulic fluid is proportional to the vehicular speed.

When the selector valve 15 is in the first state as shown in FIGS. 1–2, hydraulic fluid discharged from the pump 30 is discharged to the reservoir 17 through the inlet ports P11, P12, so that the operating resistance of the pump 30 is restrained at a smaller value. Moreover, in the first state, the outlet ports P13, P14 are in communication, so that free rotation of the motor 20 is allowed.

When the selector valve 15 is switched to the second state or the state that the ports P11, P13 are in communication, and the ports P12, P14 are in communication, hydraulic fluid from the pump 30 is inhaled in the motor 20 through the port P1 to rotate the rotors 22, 23 in the direction of arrow A1 which corresponds to the direction of arrow B of the differential casing 5 as shown in FIG. 2. Thus, the left-wheel shaft 9 on the side of the rotor 22 is forcedly rotated in the direction of arrow A1 or the direction of increased rotating speed with respect to the differential casing 5 on the side of the body 21. A relative rotation between the two serves to increase the rotating speed of the left-wheel shaft 9, and decrease that of the right-wheel shaft 10. The rate of increased and decreased rotating speed of the wheel shafts 9, 10, i.e. the rate of distribution of traction with regard thereto, can be adjusted by the pressure regulating valve 14.

On the other hand, when the selector valve 15 is switched to the third state or the state that the ports P11, P14 are in communication, and the ports P12, P13 are in communication, hydraulic fluid from the pump 30 is inhaled in the motor through the port P2 to rotate the rotors 22, 23 in the direction of arrow A2 which is opposite to the direction of arrow B of the differential casing 5 as shown in FIG. 2. Thus, the left-wheel shaft 9 on the side of the rotor 22 is forcedly rotated in the direction of arrow A2 or the direction of decreased rotating speed with respect to the differential casing 5 on the side of the body 21. A relative rotation between the two serves to decrease the rotating speed of the left-wheel shaft 9, and increase that of the right-wheel shaft 10. The rate of decreased and increased rotating speed of the wheel shafts 9, 10, i.e. the rate of distribution of traction with regard thereto, can be adjusted by the pressure regulating valve 14.

It is understood that forced rotation of the left-wheel shaft 9 in the direction of arrow A1 or A2 with respect to the differential casing 5 serves to increase the rotation speed of one of the right- and left-wheel shafts 10, 9, and decrease that of the other.

By way of a concrete example, suppose that the ratio of the characteristic discharge of hydraulic fluid of the pump 30 per rotation to that of the motor 2 per rotation is 1:1, and that the maximum rotating speed of the motor 20 is $\frac{1}{10}$ that of the pump 30. Here, when the selector valve 15 is switched to the second state to increase the rotating speed of the left-wheel shaft 9 and decrease that of the right-wheel shaft 10, the maximum rotating speed of the left-wheel shaft 9 is 1.1×V, and the minimum rotating speed of the right-wheel shaft 10 is 0.9×V where V is a rotating speed when rotating the right- and left-wheel shafts 10, 9 at the same speed, which corresponds to the vehicular speed. Of course, the rotating speeds of the wheel shafts 10, 9 can relevantly continuously be controlled by the pressure regulating valve 14 such that the control range of the rotating speed is between V and 1.1×V with regard to the left-wheel shaft 9, and between 0.9×V and V with regard to the right-wheel shaft 10. On the other hand, when the selector valve 15 is switched to the third state to decrease the rotating speed of the left-wheel shaft 9 and increase that of the right-wheel shaft 10, the minimum rotating speed of the left-wheel shaft 9 is 0.9×V, and the maximum rotating speed of the right-wheel shaft 10 is 1.1×V. Of course, the rotating speeds of the wheel shafts 10, 9 can relevantly continuously be controlled by the pressure regulating valve 14 such that the control range of the rotating speed is between 0.9×V and V with regard to the left-wheel shaft 9, and between V and 1.1×V with regard to the right-wheel shaft 10.

It is understood that the pressure regulating valve 14 and the selector valve 15 controlled by the controller 16 in accordance with the cruising state of the vehicle such as cornering allow active control of the rate of distribution of traction with regard to the right- and left-wheel shafts 10, 9, ensuring excellent cruising performance of the vehicle upon cornering, etc. In order to achieve such control, the controller 16 is relied, for example, upon input information or signals detected by a vehicular-speed sensor, a steering-angle sensor, a lateral G sensor, a yaw sensor, etc. Moreover, the discharge of the pump 30 is proportional to the vehicular speed, so that in the entire vehicular-speed range, the discharge of the pump 30 can correspond to the maximum required amount of hydraulic fluid of the motor 20. Therefore, the required amount of hydraulic fluid can automatically be ensured in accordance with the vehicular speed, resulting in improved control-ability of the vehicle.

Figure 5:
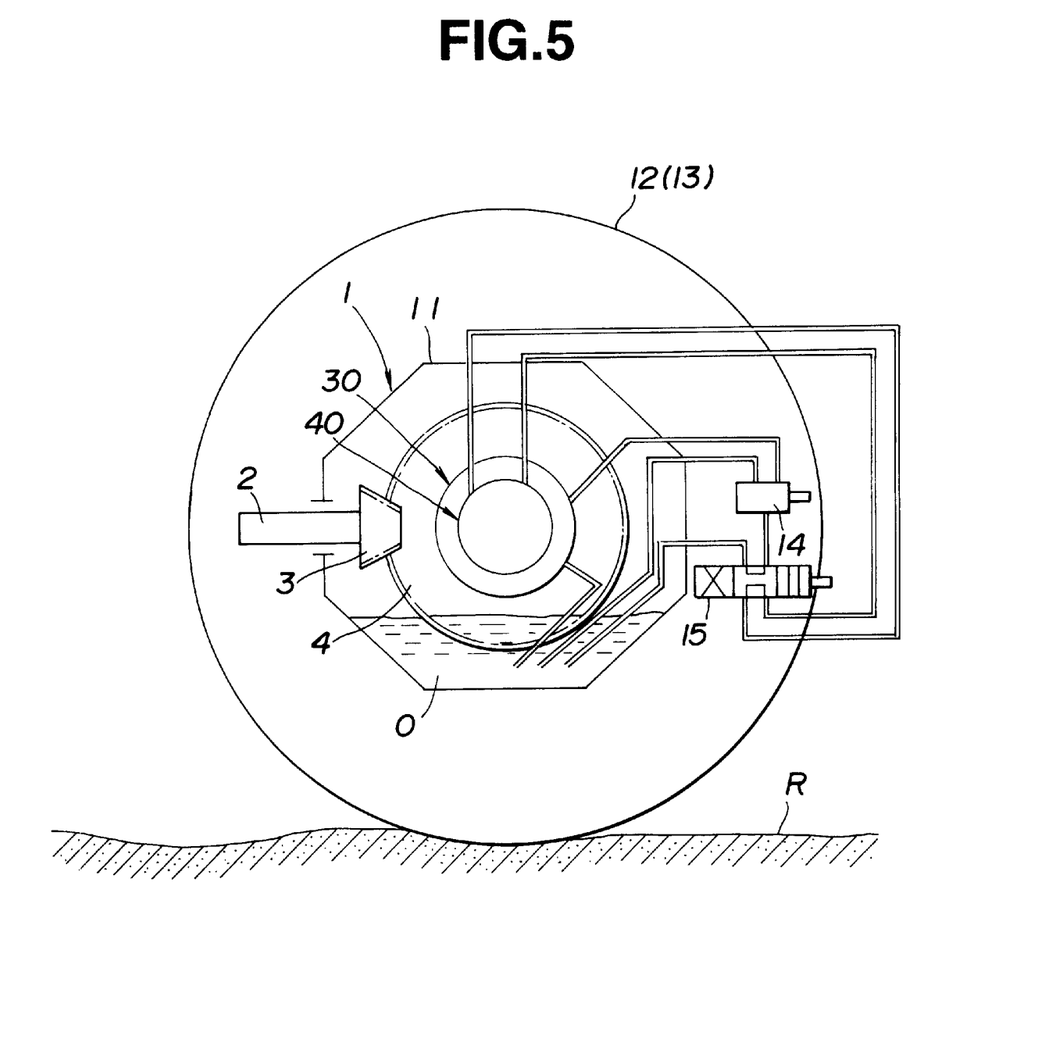
FIG. 5 is a schematic side view showing a reservoir formed in a differential casing.

Referring to FIG. 5, the reservoir 17 is in the form of a hydraulic-fluid receiver of the differential housing 11. Hydraulic fluid O within the differential housing 11 is supplied to the motor 20 by the pump 30. In FIG. 5, R designates a road. The use of a portion of the differential housing 11 where hydraulic fluid O is accumulated as the reservoir 17 enables simplified structure of the device.

It is noted that the motor 20 and the pump 30 need not be of the trochoid type, but type. Moreover, it is not necessary to arrange the pump 30 in the differential-gear mechanism 1, and it may be replaced with another supply source of hydraulic fluid.

Figure 6:
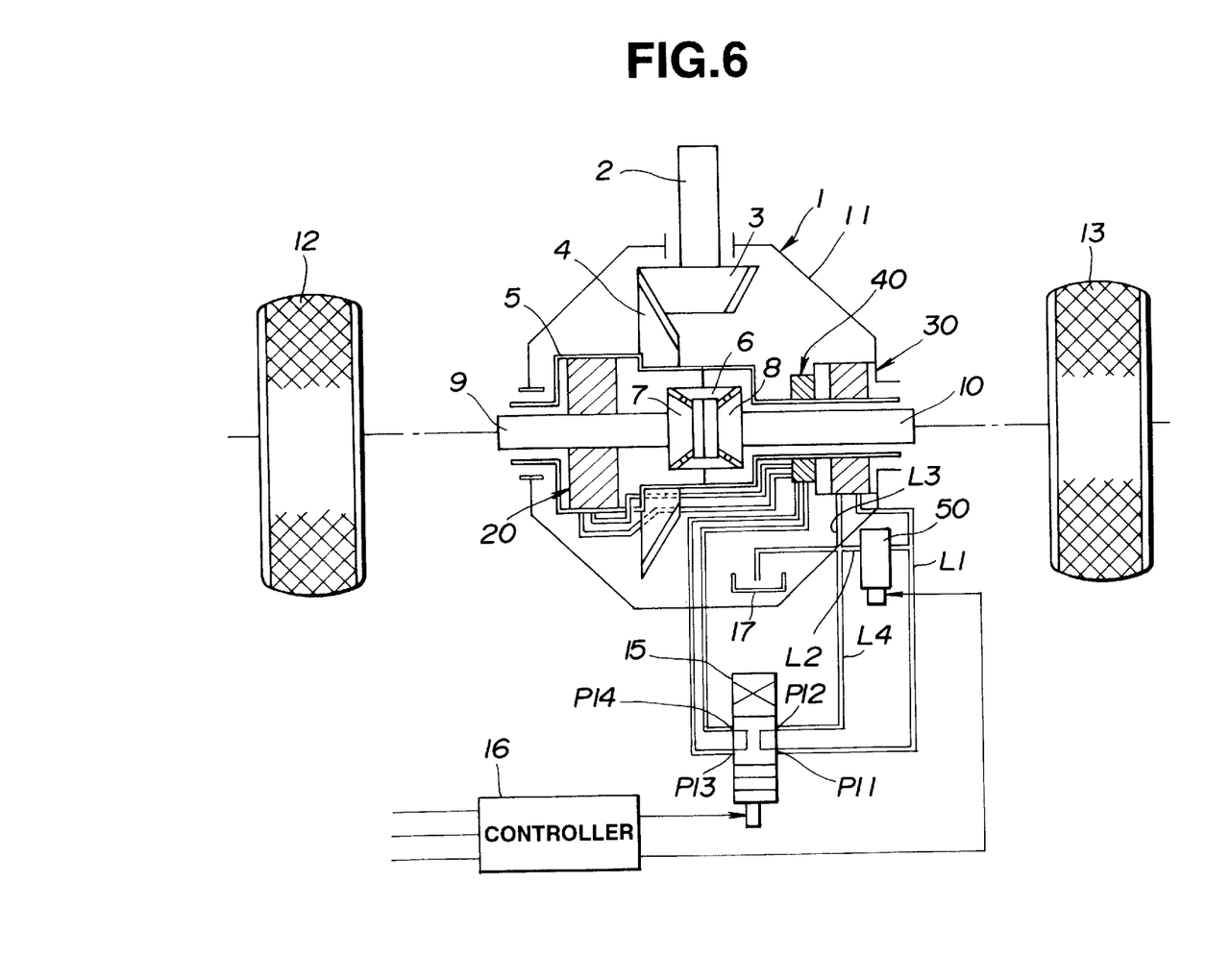
FIG. 6 is a view similar to FIG. 2, showing a second embodiment of the present invention.
Figure 7:
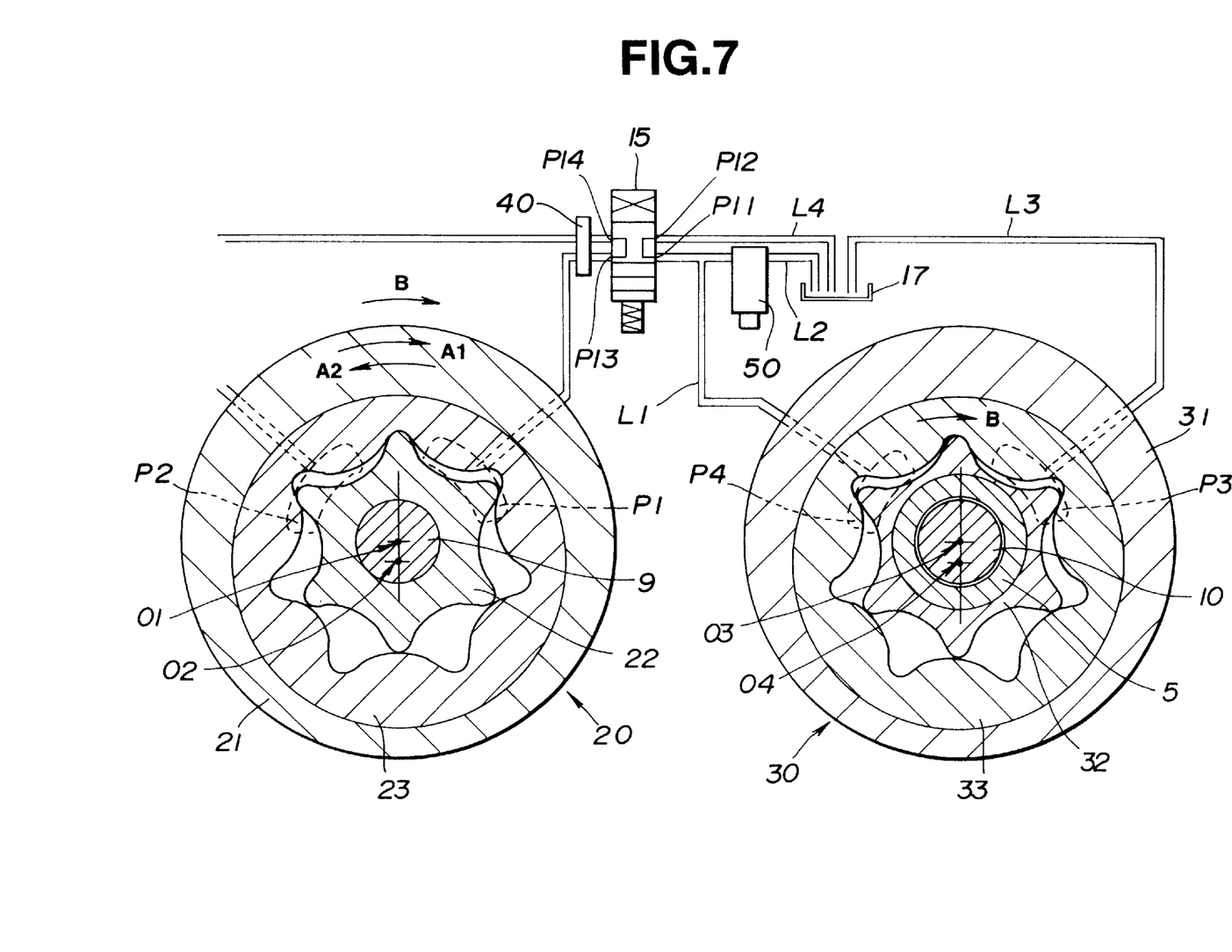
FIG. 7 is a view similar to FIG. 6, showing the trochoid motor and the trochoid pump.
Figure 8:
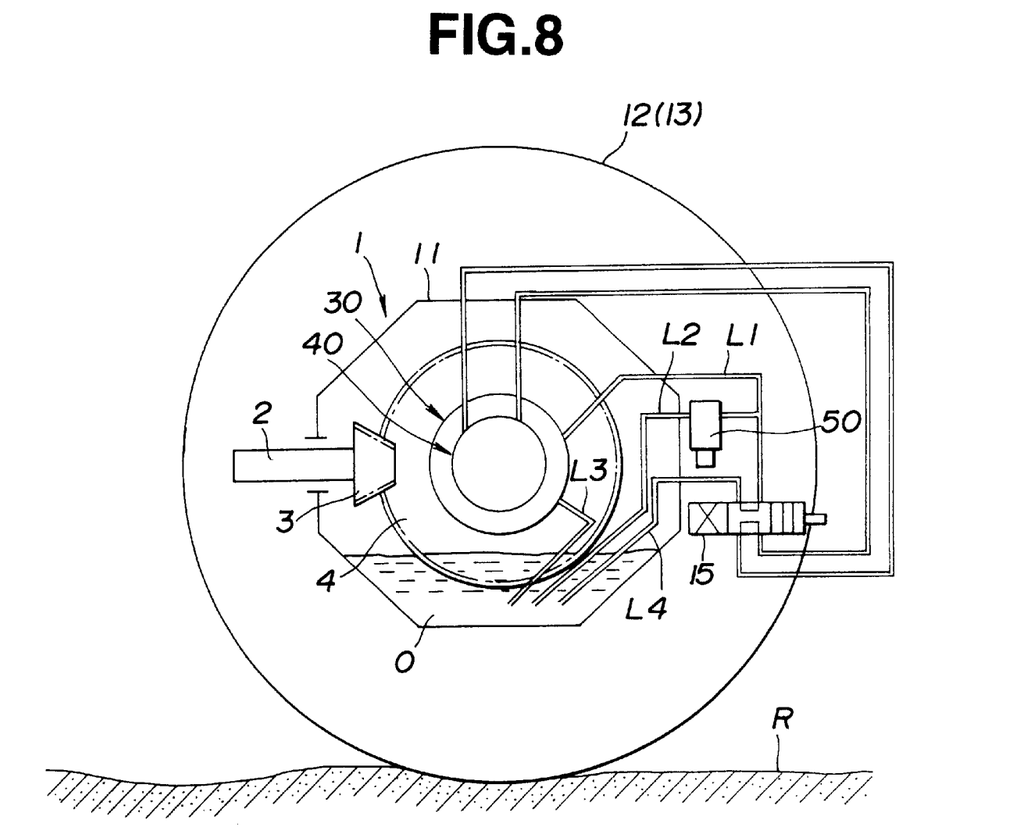
FIG. 8 is a view similar to FIG. 5, showing the reservoir formed in the differential casing.

FIGS. 6–8 show a second embodiment of the present invention wherein in place of the pressure regulating valve 14 in the first embodiment, a control-type relief valve 50 serves as hydraulic-fluid controlling means.

Referring to FIG. 7, the relief valve 50 is arranged between a supply passage L1 between the outlet port P4 of the pump 30 and the inlet port P11 of the selector valve 15 and a relief passage L2 communicating with the reservoir 17. Referring to FIG. 6, the relief passage L2 may be connected to a passage L3 between the outlet port P3 and the reservoir 17 and a passage L4 between the inlet port P12 and the reservoir 17. In the similar way to the pressure regulating valve 14, the relief valve 50 serves to adjust a pressure of hydraulic fluid supplied to the inlet port P11 in accordance with a control signal derived from the controller 16 to discharge relieved hydraulic fluid to the reservoir 17. Specifically, the relief valve 50 serves to reduce a hydraulic pressure within the supply passage L1, and return hydraulic fluid corresponding to the reduced pressure from the relief passage L2 to the reservoir 17 for circulation. This results in a reduction in a load of the pump 30 by the reduced pressure within the supply passage L1. Therefore, a temperature rise of hydraulic fluid and an increase in fuel consumption of the vehicle are restrained compared with the case using the pressure regulating valve 14 as in the first embodiment, i.e. the case of decreasing an output pressure of the inlet port P11 without reducing an input pressure of the outlet port P4.

Referring to FIG. 8, the reservoir 17 is in the form of a hydraulic-fluid receiver of the differential housing 11. Hydraulic fluid O within the differential housing 11 is supplied to the motor 20 by the pump 30.

Figure 9:
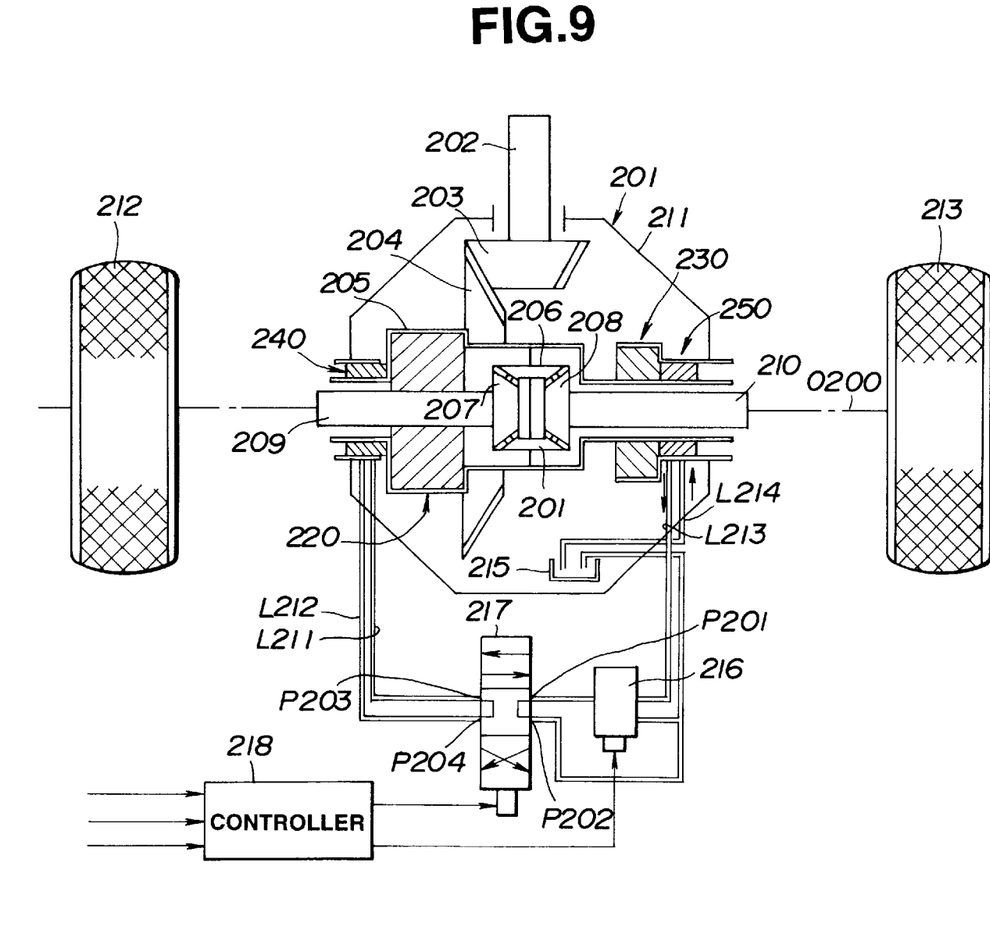
FIG. 9 is a view similar to FIG. 7, showing a third embodiment of the present invention.
Figure 10:
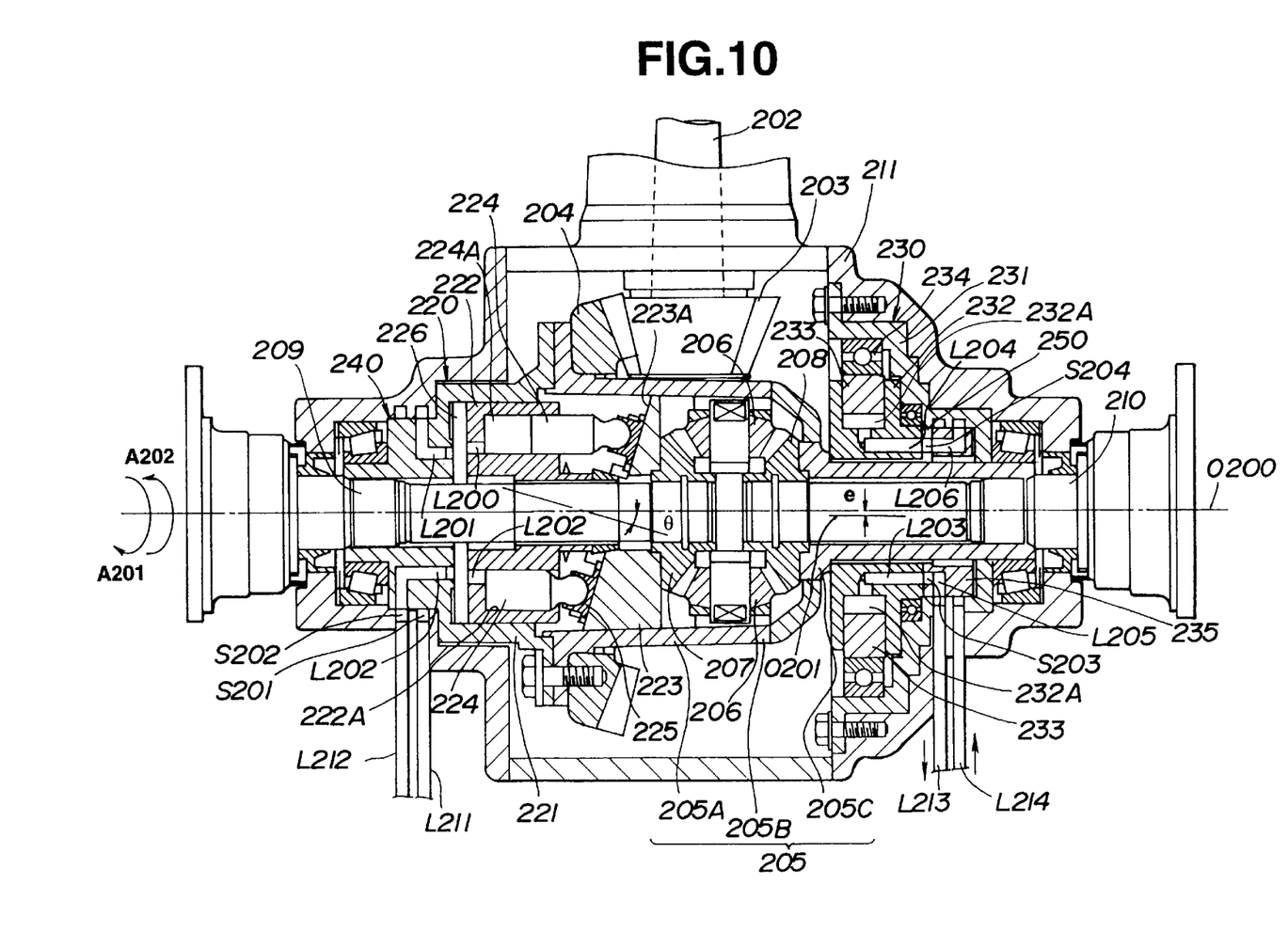
FIG. 10 is a view similar to FIG. 3, showing a differential-gear mechanism.
Figure 11:
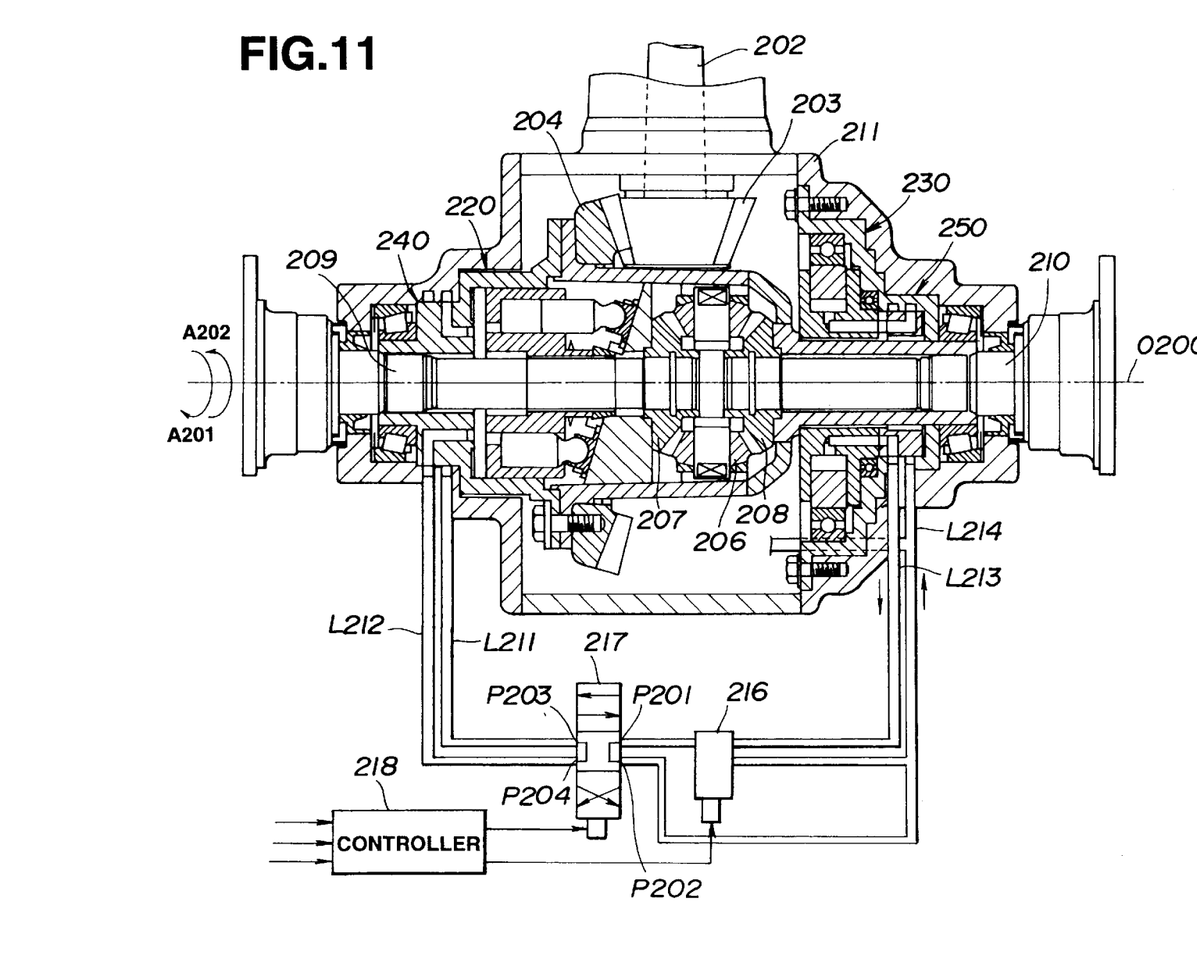
FIG. 11 is a view similar to FIG. 9, showing a hydraulic control system for a hydraulic-piston motor and a hydraulic-piston pump.

FIGS. 9–11 show a third embodiment of the present invention. Referring to FIG. 9, a motor vehicle includes a differential-gear mechanism 201 which has a similar fundamental structure to that of the conventional one such that torque of a propeller shaft 202 is transmitted to a differential casing 205 through a small reduction gear 203 and a large reduction gear 204, which is then equally distributed to shafts 210, 209 of right and left wheels 213, 212 through a small differential gear 206 and large differential gears 208, 207. Rotation of the small differential gear 206 serves to absorb the difference in the number of revolutions of the right- and left-wheel shafts 210, 209. 211 designates a differential housing as a main body of the differential-gear mechanism 201.

A traction distribution device comprises a hydraulic-piston motor 220 which can provide relative torque between the left-wheel shaft 209 and the differential casing 205 and , a hydraulic-piston pump 230 which produces a hydraulic pressure by rotation of the differential casing 205.

FIG. 10 shows the differential-gear mechanism 201 including the motor 220 and the pump 230. The differential casing 205 comprises first, second, and third component parts 205A, 205B, 205C connected to each other. Connected to the first component part 205A is a pistonmotor housing 221 which constitutes the motor 220. The motor 220 includes an axial piston motor, whereas the pump 230 includes a radial piston pump.

The axial piston motor 220 is of the so-called cam-plate type including a cam plate 223 opposite to a cylinder block 222. The cylinder block 222 is engaged with the outer periphery of the wheel shaft 209 to be rotatable with respect to the motor housing 221. The cam plate 223 is fixed to the inner periphery of the differential casing 205 to be rotatable with respect to the wheel shaft 209. Cylinder chambers 222A having openings on the right side as viewed in FIG. 10 are equidistantly formed on the same circumference of the cylinder block 222, each having therein a piston 224 which is longitudinally protrusible as viewed in FIG. 10. A ringlike piston shoe 225 is mounted on an inclined face 223A of the cam plate 223 to slidably guide a spherical head of the piston 224. In FIG. 10, $\theta$ designates an angle of inclination of the cam plate 223.

A valve plate 226 is mounted to the cylinder block 222. The valve plate 226 serves to form a hydraulic circuit interposed between a passage L200 of the cylinder block 222 which communicates with the cylinder chambers 222A and first and second passages L201, L202 of the motor housing 221 so as to change the direction of rotation of the motor 220 in accordance with whether hydraulic fluid is supplied from the first passage L201 or the second passage L202. Specifically, when hydraulic fluid is supplied from the first passage L201, the cylinder block 222 is rotated in one direction as indicated by arrow A201 with respect to the cam plate 223, whereas when hydraulic fluid is supplied from the second passage L202, the cylinder block 222 is rotated in another direction as indicated by arrow A202 with respect to the cam plate 223.

A rotary joint 240 is arranged to opposed portions of the motor housing 221 and the differential housing 211. Specifically, annular spaces S201, S202 are formed in the inner periphery of the differential housing 211, and the first passage L201 of the motor housing 221 has an opening opposite to the space S201, and the second passage L202 has an opening opposite to the space S202. Regardless of rotation of the motor housing 221, the space S201 serves to ensure communication between a duct L211 and the passage L201, and the space S202 serves to ensure communication between a duct L212 and the second passage L202.

The radial piston pump 230 is arranged between the pump housing 231 fixed to the differential housing 211 and the differential casing 205, and is of the so-called rotary-cylinder type including a rotating cylinder block 232. The cylinder block 232 is engaged with the outer periphery of the differential casing 205, in which cylinder chambers 232A having openings on the outer radial side are equidistantly circumferentially formed. Each cylinder block 232 has therein a piston 233 which is protrusible radially. An eccentric cam ring 234 which a head of the piston 233 inscribes is rotatably mounted to the inner periphery of the pump housing 231 to be rotatable about an axis O201. The cam ring 234 serves to drive the piston 233 in accordance with rotation of the cylinder block 232 to vary the volume of the cylinder chamber 232A. In FIG. 10, e designates an eccentric amount of the axis O201 with respect to the wheel shafts 10, 9 and a rotation axis O200 of the differential casing 205. A discharge passage L203 and a supply passage L204 are formed in the cylinder block 232.

A valve body 235 is mounted to the cylinder block 232. The valve body 235 and the pump housing 231 constitute a rotary valve 250. Specifically, substantially semicircular spaces S203, S204 are formed in the inner periphery of the pump housing 231 to be 180° C. offset from each other. A passage L205 of the valve body 235 which communicates with the discharge passage L203 has an opening opposite to the space S203, whereas a passage L206 of the valve body 235 which communicates with the supply passage L204 has an opening opposite to the space S204. The rotary valve 250 constructed in such a way discharges hydraulic fluid within the cylinder chamber 232A having the volume decreased with rotation of the cylinder block 232 in the direction of arrow A201 to a duct L213 through the passages L203, L205 and the space S203, and it inhales hydraulic fluid within a reservoir 215 (see FIG. 9) into the cylinder chamber 232A having the volume increased with rotation of the cylinder block 232A in the direction of arrow A201 through the passages L204, L206, the space S204, and a duct L214. The reservoir 215 may be a receiver arranged to the bottom of the differential-gear mechanism 201 to receive a predetermined hydraulic fluid as lubricating oil.

Hydraulic fluid discharged from the pump 230 through the duct L213 is adjusted in pressure by a pressure regulating valve 116 as hydraulic-pressure controlling means, which is then supplied to a selector valve 217 as switching means. The pressure regulating valve 216 serves to adjust a pressure of hydraulic fluid in accordance with a control signal derived from a controller 218 to discharge relieved hydraulic fluid to the reservoir 215.

The selector valve 217 includes a 4-port 3-position selector valve which is controlled by the controller 218 to give a first, second, or third state in accordance with a switched position. Referring to FIGS. 9 and 11, the first state is such that inlet ports P201, P202 communicate with each other, and outlet ports P203, P204 communicate with each other. The second state is such that the inlet ports P201 communicates with the outlet port P203, and the inlet port P202 communicates with the outlet port P204. The third state is such that the inlet port P201 communicates with the outlet port P204, and the inlet port P202 communicates with the outlet port P203. The inlet port P201 communicates with the pressure regulating valve 216, and the inlet port P202 communicates with the reservoir 215. The outlet ports P203, P204 are connected to the ducts L211, L212 of the motor 220, respectively. The inlet port P202 of the selector valve 217 and a port of the pressure regulating valve 216 for discharging relieved hydraulic fluid may be connected to the duct L214 as shown in FIG. 11.

Next, the operation of the third embodiment will be described.

Since the pump 230 is driven by rotation of the differential casing 205 in the direction of arrow A201 in FIG. 10, the discharge of hydraulic fluid is proportional to the vehicular speed.

When the selector valve 217 is in the first state as shown in FIGS. 9 and 11, hydraulic fluid discharged from the pump 230 is discharged to the reservoir 215 through the inlet ports P201, P202, so that the operating resistance of the pump 230 is restrained at a smaller value. Moreover, in the first state, the outlet ports P203, P204 are in communication, so that free rotation of the motor 220 is allowed.

When the selector valve 217 is switched to the second state or the state that the ports P201, P203 are in communication, and the ports P202, P204 are in communication, hydraulic fluid from the pump 230 is inhaled in the motor 220 through the duct L211 to rotate the cylinder block 222 on the side of the wheel shaft 209 in the direction of arrow A201 as shown in FIG. 10 with respect to the cam plate 223 on the side of the differential casing 205. That is, the wheel shaft 209 is rotated in the direction of arrow A201 which corresponds to the direction of rotation of the differential casing 205. Thus, the left-wheel shaft 209 is forcedly rotated in the direction of arrow A201 or the direction of increased rotating speed with respect to the differential casing 205. A relative rotation between the two serves to increase the rotating speed of the left-wheel shaft 209, and decrease that of the right-wheel shaft 210. The rate of increased and decreased rotating speed of the wheel shafts 209, 210, i.e. the rate of distribution of traction with regard thereto, can be adjusted by the pressure regulating valve 216.

On the other hand, when the selector valve 217 is switched to the third state or the state that the ports P201, P204 are in communication, and the ports P202, P203 are in communication, hydraulic fluid from the pump 230 is inhaled in the motor 220 through the duct 212 to rotate the cylinder block 222 on the wheel shaft 209 in the direction of arrow A202 as shown in FIG. 10 with respect to the cam plate 223 on the differential casing 205. That is, the wheel shaft 209 is rotated in the direction of arrow A202 which is opposite to the direction of rotation of the differential casing 205. Thus, the left-wheel shaft 209 is forcedly rotated in the direction of arrow A202 or the direction of decreased rotating speed with respect to the differential casing 205. A relative rotation between the two serves to decrease the rotating speed of the left-wheel shaft 209, and increase that of the right-wheel shaft 210. The rate of decreased and increased rotating speed of the wheel shafts 209, 210, i.e. the rate of distribution of traction with regard thereto, can be adjusted by the pressure regulating valve 216.

It is understood that forced rotation of the left-wheel shaft 209 in the direction of arrow A201 or A202 with respect to the differential casing 205 serves to increases the rotation speed of one of the right- and left-wheel shafts 210, 209, and decrease that of the other. The rotating speeds of the right- and left-wheel shafts 210, 209 can relevantly continuously be controlled by the pressure regulating valve 216.

It is also understood that the pressure regulating valve 216 and the selector valve 217 controlled by the controller 218 in accordance with the cruising state of the vehicle such as cornering allow active control of the rate of distribution of traction with regard to the right-and left-wheel shafts 210, 209, ensuring excellent cruising performance of the vehicle upon cornering, etc. In order to achieve such control, the controller 218 is relied, for example, upon input information or signals detected by a vehicular-speed sensor, a steering-angle sensor, a lateral G sensor, a yaw sensor, etc. Moreover, the discharge of the pump 230 is proportional to the vehicular speed, so that the discharge of the pump 230 can correspond to the maximum required amount of hydraulic fluid of the motor 220 in the entire vehicular speed range. Therefore, the required amount of hydraulic fluid can automatically be ensured in accordance with the vehicular speed, resulting in improved control-ability of the vehicle.

It is also understood that the use of the motor 220 and the pump 230 of the piston type enables restrained leakage of hydraulic fluid, and thus achievement of highly pressurized hydraulic fluid of, e.g. 30 Mps, resulting in improved control-ability of the vehicle. It is noted that the motor 220 and the pump 230 of the trochoid type produce a greater leakage of hydraulic fluid, which makes high pressurization of hydraulic fluid difficult, attaining 10 Mps at the best.

It is noted that the motor 220 and the pump 230 only need to be of the piston type, and various combinations are possible in addition to combination of an axial piston pump and a radial piston pump in the third embodiment such as combination of an axial piston motor and an axial piston pump, that of a radial piston motor and a radial piston pump, and that of a radial piston motor and an axial piston pump. Moreover, the pump 230 need not be arranged in the differential-gear mechanism 201, and may be replaced with another supply source of hydraulic fluid.

Figure 12:
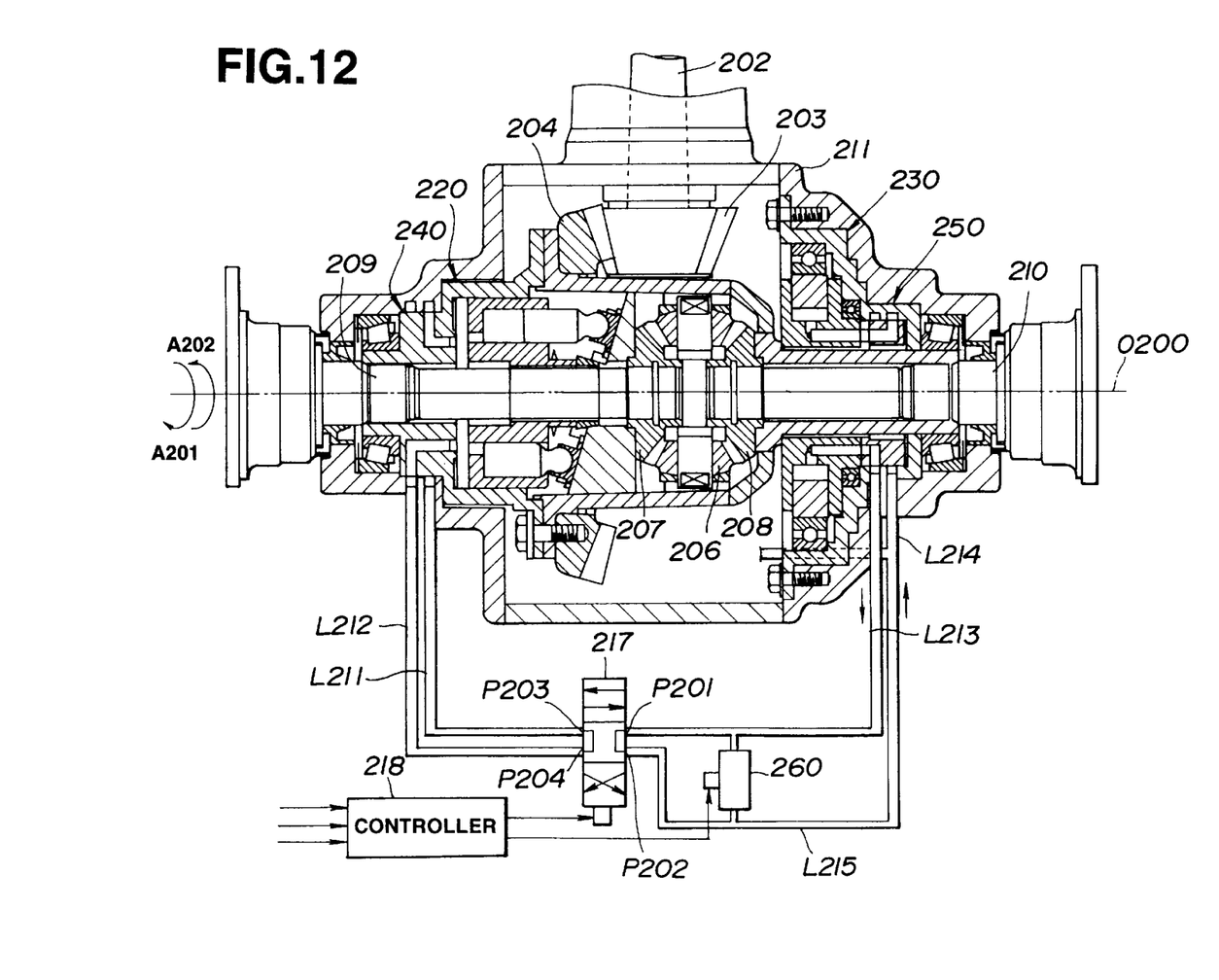
FIG. 12 is a view similar to FIG. 11, showing a fourth embodiment of the present invention.

FIG. 12 shows a fourth embodiment of the present invention wherein in place of the pressure regulating valve 216 in the third embodiment a control-type relief valve 260 serves as hydraulic-pressure controlling means.

Referring to FIG. 12, the relief valve 260 is arranged between the duct L213 and a relief passage L215 communicating with the reservoir 215. In the similar way to the pressure regulating valve 216, the relief valve 260 serves to adjust a pressure of hydraulic fluid supplied to the inlet port P201 in accordance with a control signal derived from the controller 218 to discharge relieved hydraulic flue to the reservoir 215. Specifically, the relief value 260 serves to reduce a hydraulic pressure within the duct L213, and return hydraulic fluid corresponding to the reduced pressure from the relief passage L215 to the reservoir 215 for circulation. This results in a reduction in a load of the pump 230 by the reduced pressure within the duct L213. Therefore, a temperature rise of hydraulic fluid and an increase in fuel consumption of the vehicle are restrained compared with the case using the pressure regulating valve 216 as in the third embodiment, i.e. the case of decreasing an output pressure of the inlet port P201 without reducing an input pressure of the duct L213.

Figure 13:
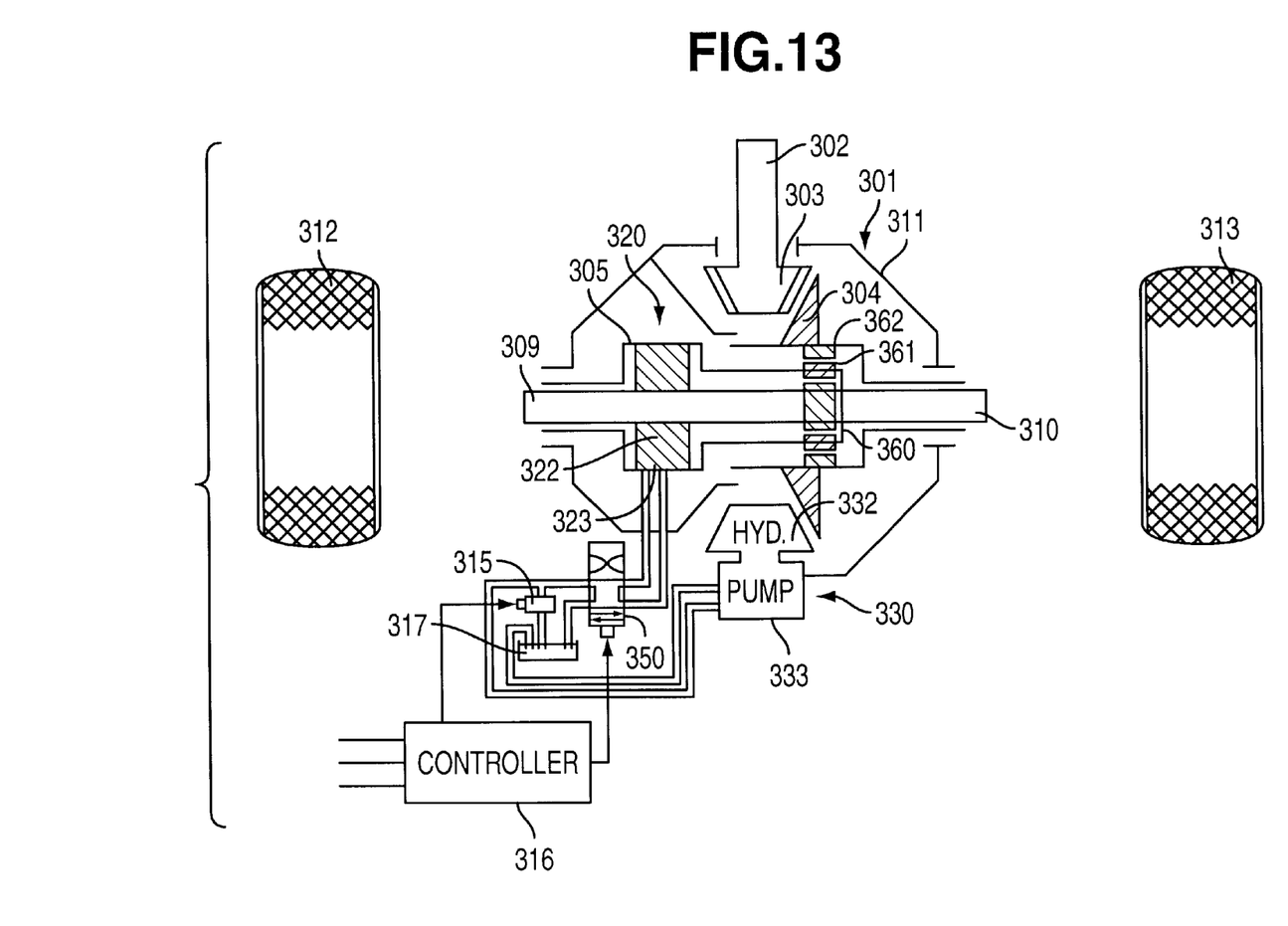
FIG. 13 is a view similar to FIG. 12, showing a fifth embodiment of the present invention.
Figure 14:
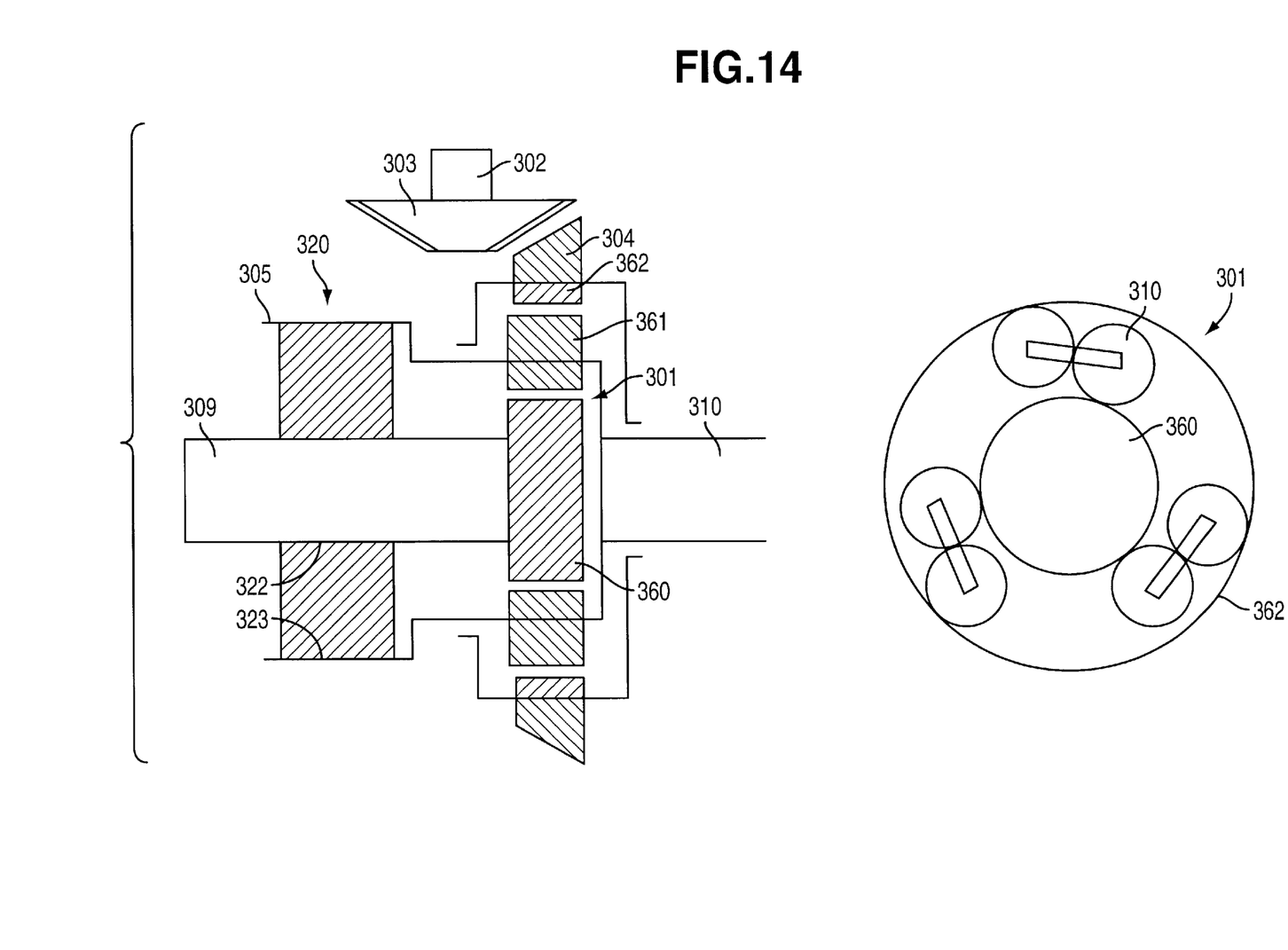
FIG. 14 is an enlarged schematic view showing a hydraulic motor and a planetary differential-gear mechanism.

FIGS. 13–14 show a fifth embodiment of the present invention which is substantially the same as the above embodiments except that the differential-gear mechanism is of the planetary type. Specifically, in place of the typical differential-gear mechanism as described in the above embodiments, the differential-gear mechanism includes a planetary gearset 301 including an internal or ring gear 362, planet gears 361, and a sun gear 360. The planet gears 361 are connected to a right-wheel shaft 310 and a differential casing 305, and the sun gear 360 is connected to a left-wheel shaft 309. Torque of a propeller shaft 302 is transmitted to the differential casing 305 through a small reduction gear 303, a large reduction gear 304, the internal gear 362, and the planet gears 361, which is then equally distributed to the shafts 310, 309 of right and left wheels 313, 312 through the planet gears 361 and the sun gear 360. A detailed structure of the planetary differential-gear mechanism 301 is disclosed, for example, in Japanese Patent Application 11-80861 filed on Mar. 25, 1999, the entire contents of which is incorporated herein by reference. In FIG. 13, 311 designates a differential housing as a main body of the differential-gear mechanism 310.

A hydraulic motor 320 includes an inner portion 322 fixed to the outer periphery of the left-wheel shaft 309 and an outer portion 320 fixed to the inner periphery of the differential casing 305. That is, the hydraulic motor 320 is located between the right- and left-wheel shafts 310, 309. A hydraulic pump 330 includes in a body (no numeral) an inner rotor 332 and an outer rotor 333 rotatably engaged therewith. The inner rotor 332 is engaged with the differential casing 305 through a transmission gear (no numeral), the internal gear 362, and the planet gears 361. The body of the pump 330 is mounted to the differential housing 311 as shown in FIG. 13. The structure and operation of valves 350, 315, a controller 316, and a reservoir 317 are fundamentally similar to the corresponding ones of the embodiment as shown in FIGS. 7–8.

According to the fifth embodiment, the above disposition of the hydraulic motor 320 allows its torque to be distributed between the right- and left-wheel shafts 313, 312 without any reduction due to the differential-gear mechanism 301. Therefore, sufficiently great torque can be obtained by a small hydraulic motor.

Having described the present invention in connection with the preferred embodiments, it is noted that the present invention is not limited thereto, and various changes and modifications can be made without departing from the scope of the present invention.

What is claimed is:

1. A traction distribution device for a motor vehicle with wheel shafts, comprising:
    a differential, said differential comprising a differential casing and a differential-gear mechanism, wherein the differential-gear mechanism transmits torque of the differential casing to the wheel shafts;
    a source of a hydraulic pressure, said source including a hydraulic pump which produces said hydraulic pressure by torque of the differential casing;
    a hydraulic motor arranged to interact with the differential-gear mechanism, said motor providing relative torque between one of the wheel shafts and the differential casing in accordance with a direction of said hydraulic pressure supplied thereto, said hydraulic motor including a trochoid motor, said trochoid motor comprising a shell portion and a core portion which produce relative rotation in accordance with said direction of said hydraulic pressure, said shell portion being connected to the differential casing, said core portion being connected to said one of the wheel shafts;
    means for controlling said hydraulic pressure supplied to said motor; and
    means for switching said direction of said hydraulic pressure supplied to said motor.

2. A motor vehicle with wheel shafts, comprising:
    a differential casing;
    a differential-gear mechanism that transmits torque of said differential casing to the wheel shafts, said differential-gear mechanism having a housing, said differential-gear mechanism comprising a planet gearset including a sun gear connected to one of the wheel shafts, and planet gears connected to another of the wheel shafts and said differential casing;
    a pump arranged between said differential casing and said housing of said differential-gear mechanism, said pump always producing a hydraulic pressure due to relative rotation between said differential casing and said housing of said differential-gear mechanism during cruising of the motor vehicle;
    a motor arranged to interact with said differential-gear mechanism, said motor being arranged between the wheel shafts, said motor providing relative torque between said one of the wheel shafts and said differential casing in accordance with a direction of said hydraulic pressure supplied thereto;
    a controller that controls said hydraulic pressure supplied to said motor;
    a switch that switches said direction of said hydraulic pressure supplied to said motor; and
    a control unit that controls said controller in accordance with conditions of cruising of the motor vehicle.

3. A traction distribution device as claimed in claim 1, wherein said controlling means includes a relief valve.

4. A traction distribution device as claimed in claim 1, wherein said switching means includes a selector valve.

5. A traction distribution device for a motor vehicle with wheel shafts, comprising:
    a differential, said differential comprising a differential casing and a differential-gear mechanism, wherein the differential-gear mechanism transmits torque of the differential casing to the wheel shafts;
    a source of hydraulic pressure, said source including a hydraulic pump which produces said hydraulic pressure by torque of the differential casing;
    a hydraulic motor arranged to interact with the differential-gear mechanism, said motor providing relative torque between one of the wheel shafts and the differential casing in accordance with a direction of said hydraulic pressure supplied thereto, said hydraulic motor including a trochoid motor, said trochoid motor comprising a shell portion and core portion which produce relative rotation in accordance with said direction of said hydraulic pressure, said shell portion being connected to the differential casing, said core portion being connected to said one of the wheel shafts;
    a relief valve that controls said hydraulic pressure to said motor; and
    a selector valve that switches said direction of said hydraulic pressure supplied to said motor.

* * * * *